(12) United States Patent
Gyurko et al.

(10) Patent No.: US 12,736,619 B2
(45) Date of Patent: Sep. 15, 2026

(54) SENSOR SYSTEM AND METHOD FOR DETERMINING AN ARTICULATION ANGLE OF A VEHICLE WITH A TRAILER

(71) Applicant: KNORR-BREMSE Systeme fuer Nutzfahrzeuge GmbH, Munich (DE)

(72) Inventors: Zoltan Gyurko, Budapest (HU); Huba Nemeth, Budapest (HU); Tamas Gyenis, Budapest (HU); Nora Meszaros, Gencsapati (HU); Kornel Straub, Pomaz (HU); Sinka Oers, Kecskemet (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 444 days.

(21) Appl. No.: 18/215,277

(22) Filed: Jun. 28, 2023

(65) Prior Publication Data

US 2024/0004028 A1 Jan. 4, 2024

(30) Foreign Application Priority Data

Jun. 29, 2022 (EP) .................................... 22181771

(51) Int. Cl.
*G01S 7/40* (2006.01)
*G01S 13/88* (2006.01)

(52) U.S. Cl.
CPC ................ *G01S 7/40* (2013.01); *G01S 13/88* (2013.01)

(58) Field of Classification Search
CPC .................................. G01S 7/40; G01S 13/88
See application file for complete search history.

(56) References Cited

U.S. PATENT DOCUMENTS

2016/0049020 A1 2/2016 Kuehnle et al.
2021/0129906 A1* 5/2021 Oh ....................... B62D 15/025
2022/0291377 A1* 9/2022 Medinei ............... B62D 15/021

FOREIGN PATENT DOCUMENTS

EP 1 459 963 B1 6/2006
JP 2001-334966 A 12/2001
JP 2002-120775 A 4/2002
KR 10-2019-0060574 A 6/2019

OTHER PUBLICATIONS

Extended European Search Report issued in European Application No. 22181771.1 dated Jan. 12, 2023 (10 pages).
European Office Action issued in European Application No. 22 181 771.1 dated Jul. 2, 2025 (5 pages).

* cited by examiner

*Primary Examiner* — Nazra Nur Waheed
(74) *Attorney, Agent, or Firm* — Crowell & Moring LLP

(57) ABSTRACT

A sensor system determines an articulation angle of a vehicle with a trailer. The system includes a first sensor device, a second sensor device, and a processing unit. The first sensor device can be mounted on a first side of the vehicle and is configured to provide first sensor signals as multiple reflection points of a first side of the trailer. The second sensor device can be mounted on a second side of the vehicle and is configured to provide second sensor signals as multiple reflection points of a second side of the trailer. The processing unit is configured to generate an interpolation between the multiple reflection points in the first sensor signals and/or in the second sensor signals and to determine the articulation angle by comparing the interpolation with previous interpolations or with a vehicle coordinate system.

12 Claims, 5 Drawing Sheets

SENSOR SYSTEM AND METHOD FOR DETERMINING AN ARTICULATION ANGLE OF A VEHICLE WITH A TRAILER

CROSS REFERENCE TO RELATED APPLICATION

This application claims priority under 35 U.S.C. § 119 from European Patent Application No. 22181771.1, filed Jun. 29, 2022, the entire disclosure of which is herein expressly incorporated by reference.

BACKGROUND AND SUMMARY

The present invention relates to a sensor system and a method for determining an articulation angle of a vehicle with a trailer and, in particular, to a side sensor-based articulation angle detection for a commercial vehicle combination (truck and trailer).

The angle between longitudinal axes of a towing vehicle and a trailer of an articulated vehicle combination is an important input for path planning, control and many driver assistance functions. Non-zero articulation angles appear in many situations. For example, when the vehicle combination follows a curve of the road, the driver or an autonomous driving unit has to take into account that the trailer, when following the curve, will make a lateral movement in the direction of the curve. This is especially important, when the vehicle makes a right or left turn at a junction and pedestrians or cyclists are at risk. Another application is the reversing, for example when the vehicle approaches a dock or during other backwards motions. Likewise, when parking the vehicle, forward or backward turning motions are often needed which have to take into account articulation angles of the trailer which will result in lateral movements of the trailer. These examples are especially critical when the trailer extends significantly in the rear direction as it is the case for commercial vehicle combinations.

In order to maintain a high level of safety, there is a demand for determining reliably articulation angles of a trailer compared to the towing vehicle (truck) to support the driver or any kind of driver assistance function.

At least some of the above-mentioned problems are overcome by a sensor, a method, and a computer-readable storage device, according to the independent claims. The dependent claims refer to further advantageous realizations of the subject matter of the independent claims.

The present invention relates to a sensor system for determining an articulation angle of a vehicle with a trailer. The system includes a first sensor device, a second sensor device, and a processing unit. The first sensor device can be mounted on a first side (e.g. right-hand side) of the vehicle and is configured to provide first sensor signals as multiple reflection points of a first side of the trailer. The second sensor device can be mounted on a second side (e.g. a left-hand side) of the vehicle and is configured to provide second sensor signals as multiple reflection points of a second side of the trailer. The processing unit is configured to generate an interpolation between the multiple reflection points in the first sensor signals and/or in the second sensor signals and to determine the articulation angle by comparing the interpolation with previous interpolations or with a vehicle coordinate system (e.g. of the truck and/or trailer).

The term "vehicle with a trailer" shall be construed broadly within this disclosure and may include any vehicle combination or articulated vehicle such as articulated buses, articulated haulers etc. The vehicle coordinate system may be a coordinate system defining a longitudinal direction (e.g. perpendicular to a front side of the vehicle or trailer) and lateral side direction (perpendicular to the longitudinal direction). In particular, the articulation angle can be determined during a motion of the vehicle and can be measured in a vehicle coordinate system, e.g. as a deviation between the longitudinal directions of the towing vehicle and the trailer.

The first sensor device and/or the second sensor device may include a radar device and/or a lidar device and/or an ultrasonic device. Therefore, embodiments rely especially on non-optical measurements (not based on images) for determining the articulation angle. There is no need for cameras or other optical equipment. In particular, the detected reflection points are not pixels of an image captured by a camera. Instead, the sensor devices will transmit signals into the captured areas and will receive return signals from the reflection points. By measuring the time-of-flight of the signals, the sensor devices are able to determine a distance to the reflection points as it is common for radar/lidar devices. Radar sensors provide the advantage that they can be used under almost all weather conditions. Moreover, since the trailer provides a large reflection area, occurring reflections can reliably be detected.

According to embodiments there may be only a single sensor device on each side of the vehicle. According to further embodiments there may be more than one sensor device (e.g. of different type) on at least one side of the vehicle.

According to embodiments, there is further no need to detect dedicated points at the trailer such as the corners—any reflection points can be utilized. Therefore, optionally, the processing unit is configured to consider any random reflection points on the trailer when generating the interpolation.

Optionally, the processing unit is further configured to ignore reflections from a front side of the trailer and to consider only reflection points from the left-hand side of the trailer and/or from the right-hand side of the trailer when generating the interpolation.

Optionally the processing unit is configured to generate as interpolation a line or a (geometric) plane approximating the left-hand side or the right-hand side of the trailer. The interpolating object (line or plane) shall in particular extend in a longitudinal direction of the trailer.

Optionally, the processing unit is configured to ascertain a zero-articulation angle:

- when the first sensor device and/or the second sensor device are not providing any reflection points (from the trailer left/right side), and/or
- when both the first sensor device and the second sensor device are providing reflection points (from the trailer left/right side), and/or
- when the first sensor device (110) and the second sensor device (120) are not providing any reflection points (R1, R2, . . . ) or are providing symmetric reflection points (in case the vehicle and/or trailer have a symmetric shape), and/or
- when the vehicle makes a straight motion (in case the vehicle and/or trailer have an asymmetric shape/structure).

The symmetric reflection points may be related to a mirror symmetric reflection pattern. For example, the plurality of reflection points may constitute a point cloud, wherein each point of the point cloud relates to a reflection from the trailer. If the resulting pattern is mirror-symmetric on both sides of the trailer (when the mirror axis is along longitudinal direction), the zero-articulation angle situation can be asserted. Moreover, the straight motion can be derived from other sensors (e.g. for the steering angle) and the reflection pattern obtained in this situation—whether it is symmetric or asymmetric—can be associate with the zero-angle articulation situation. In addition, based on this, subsequent non-zero articulation angels can be estimated or calculated (e.g. by assessing deformations of the reflection pattern with time). Furthermore, an asymmetric reflection pattern may be stored so that a return to the straight motion situation can be recognized.

For example, the first sensor device and/or the second sensor device may be mounted on the vehicle such that no reflections are detected by the first and second sensor devices when the vehicle is moving together with the trailer in a straight-ahead direction (i.e. the trailer is invisible to the sensors). Alternatively, the first sensor device and the second sensor device may be mounted on the vehicle such that both the first sensor device and the second sensor devices provide reflection from sides of the trailer when the vehicle is moving together with the trailer in a straight-ahead direction.

Optionally, the processing unit is configured to generate multiple interpolations successively when the vehicle is moving with the trailer to determine the articulation angle as function of time. For example, a new interpolation may be determined every couple of seconds (or in every computational cycle). Optionally, the determination of a new interpolation may be triggered by detecting a turning operation or the intend of making a turn. This may be triggered by a non-zero steering angle or a detection of the lateral acceleration in the vehicle.

Optionally, the processing unit is configured to average successively determined interpolations over a predetermined time period and/or to ignore determined interpolations that are below a predetermined minimal extension. This implements a filtering. For example, wind, road potholes or other road irregularities may cause lateral fluctuations or variations of the trailer resulting in isolated reflection points. Such events may be filtered by averaging over a time period of e.g. 1 second or 3 seconds. If an actual trailer articulation has occurred, the determined interpolation (line or plane) should have at least a minimal extension. For example, the (longitudinal) length of the determined interpolation should be more than 30 cm or more than a meter. Similarly, a valid interpolation should include a minimum number of reflection points (e.g. more than 5 or more than 10 or more than 50). When only a few isolated reflection points are detected, these detections may be disregarded as artifacts, not being associated with an actual trailer articulation.

Optionally, the processing unit is configured to enable a calibration. During the calibration the processing unit may be configured to determine the articulation angle and to compare the determined articulation angle with a calibration value. The calibration value may be provided by a secondary articulation sensor or by the fact that the vehicle moves along a predetermined path associated with a fixed articulation angle. Furthermore, the processing unit may be configured to receive an information about a trailer change, in which case the calibration performed for a previous trailer can be ignored.

Further embodiments relate to a vehicle (in particular a truck or another long-haul commercial vehicle able to tow a trailer) with a sensor system as described before, wherein the first sensor device is mounted on a right-hand side of the (towing) vehicle and the second sensor device is mounted on a left-hand side of the (towing) vehicle. The vehicle with a trailer shall include any vehicle combination or an articulated vehicle.

Further embodiments relate to a method for determining an articulation angle of a vehicle with a trailer, wherein a first sensor device is mounted on a first side of the vehicle and a second sensor device is mounted on a second side of the vehicle. The method includes:

- receiving first sensor signals from the first sensor device and/or second sensor signals from the second sensor device as multiple reflection points of the first or second side of the trailer;
- generating an interpolation between the multiple reflection points; and
- determining the articulation angle by comparing the interpolation with previous interpolations or with a vehicle coordinate system.

This method may also be implemented in software or a computer program product and the order of steps may be different. Embodiments of the present invention can, in particular, be implemented in an electronic control unit, ECU, or may be implemented by software or as software modules in any ECU of the vehicle. Therefore, further embodiments relate to a computer program or a computer-readable storage medium having a program code for enabling a data processing unit to perform the method, when the program code is executed on the data processing unit.

Embodiments overcome at least some of the above-mentioned problems by a sensor system which includes side sensors such as radar(s) and/or lidar(s) and a processing unit to calculate the articulation angle between the towing vehicle and the trailer by evaluating sensor signals from left- and right-side looking sensors on the tractor unit. The accordingly mounted sensors are capable of covering the area next to the trailer in order to detect any reflections of the exemplary radar/lidar from the trailer. Therefore, these sensors are able to detect the trailer itself—in particular when it is not aligned with the vehicle meaning that the articulation angle is non-zero. From this detection the relative position of the trailer can be calculated, which results in an articulation angle estimate.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
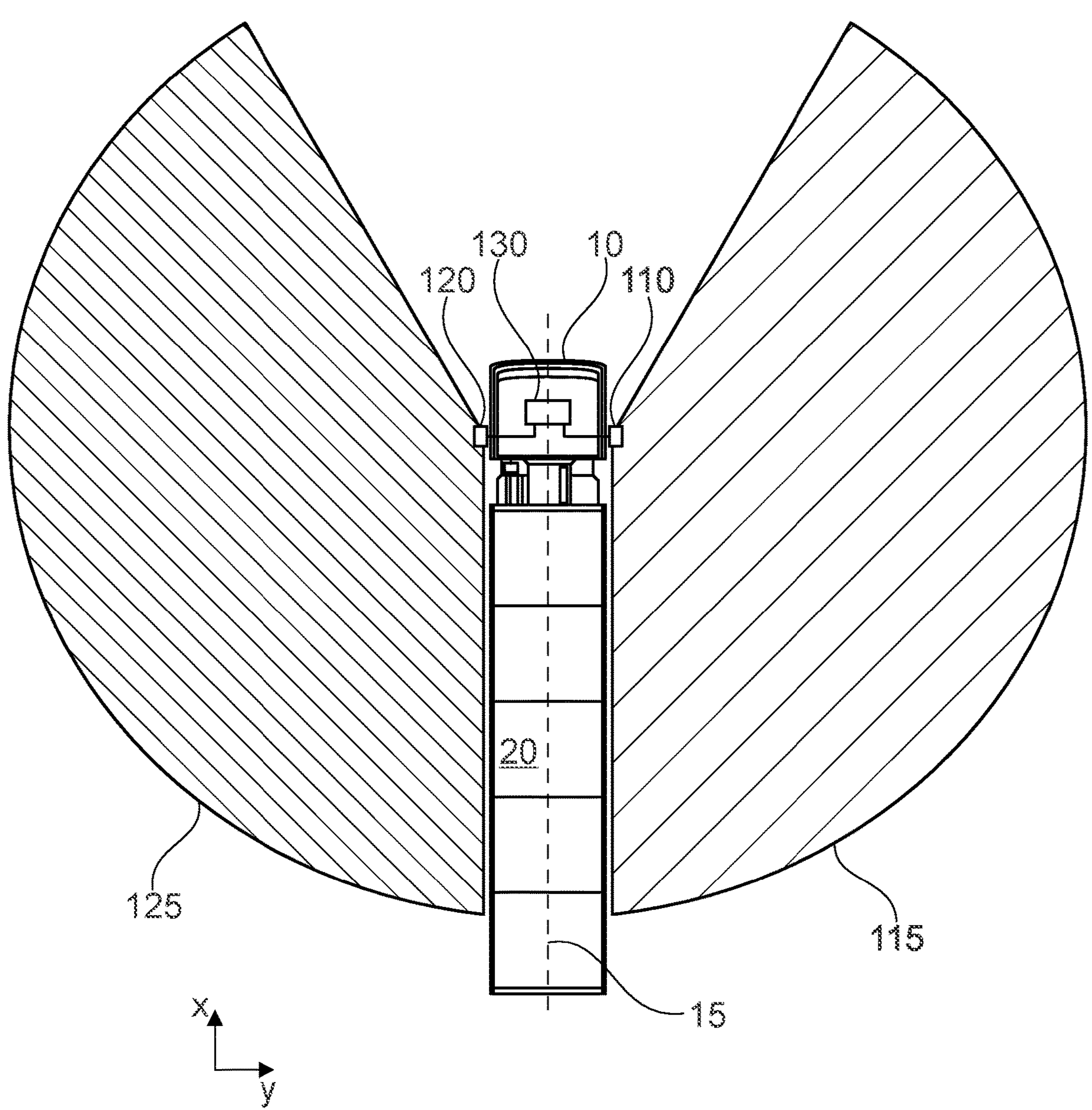
FIGS. 1A, 1B depict a sensor system according to an embodiment of the present invention.

FIG. 1A depicts a sensor system according to an embodiment of the present invention which includes a first sensor device 110, a second sensor device 120 and a processing unit 130. The first sensor device 110 may be mounted on a first side of the vehicle 10 and may be configured to generate first sensor signals indicating multiple reflection points of the first side of the trailer 20. The second sensor device 120 can be mounted on the second side of the vehicle 10 and may be configured to generate second sensor signals indicating multiple reflection points of the second side of the trailer 20. The first side may be the right-hand side and the second side may be the left-hand side of the vehicle 10.

The first sensor device 110 may have a coverage area 115 extending in the rear direction parallel to the vehicle combination 10, 20 and covering the angular range of, for example, 120° (or at least of 60°) towards the front side. Similarly, the second sensor device 120 has a coverage area 125 which extends parallel to the vehicle combination 10, 20 to the rear side and extends over an angular range of, for example, 120° (or at least of 60°) towards the front side. The coverage areas 115, 125 may extend to the rear (at least) up to the end of the trailer 20. But range to the rear may also be shorter than the trailer 20 (as depicted in FIG. 1A). The angular range can also be different, but should be large enough to be able to detect all possible articulation angles between the trailer 20 and the vehicle 10.

The processing unit 130 of the sensor system is configured to generate an interpolation between multiple reflection points in the first sensor signals and/or in the second sensor signals. The interpolation may define a line or a plane associated with the respective side surface of the trailer 20. The processing unit 130 may further be adapted to determine the articulation angle by comparing the interpolation with previous interpolations or with a vehicle coordinate system 15. The vehicle coordinate system 15 defines for example a coordinate system for the vehicle with one direction in the forward, longitudinal direction (for example x-direction) and a lateral direction (for example y-axis), wherein x-direction (longitudinal axis) may be the driving direction if no steering angle is applied to the vehicle 10. A similar coordinate system can be defined for the trailer 20 and any deviation between both coordinate systems of the vehicle 10 and the trailer 20 may be used to define the articulation angle of the trailer 20.

Figure 1B:
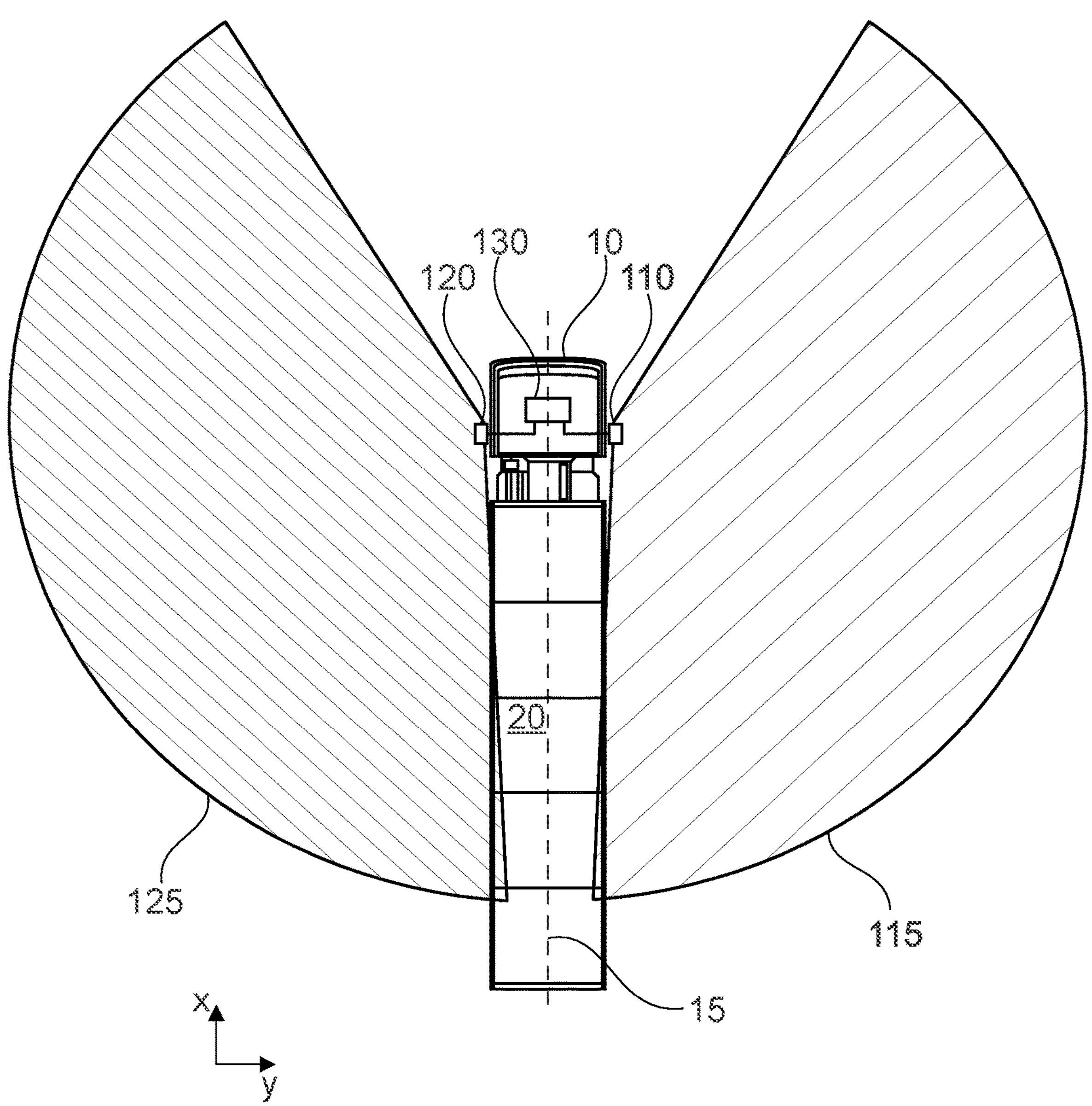

FIG. 1B depicts the same situation as in FIG. 1A, but in this embodiment the first sensor devices 110 and the second sensor devices are mounted on the vehicle 10 to detect the trailer even for the shown zero-articulation. The coverage areas 115, 125 will thus always cover at least one portion of the trailer 20 (both side for zero-articulation and one side for non-zero articulation).

It is understood that the first sensor device 110, second sensor device 120, and the processing unit 130 might be available hardware of the vehicle 10. In this case, the embodiments are implemented in the installed software that enables the functions as described before.

Figure 2A:
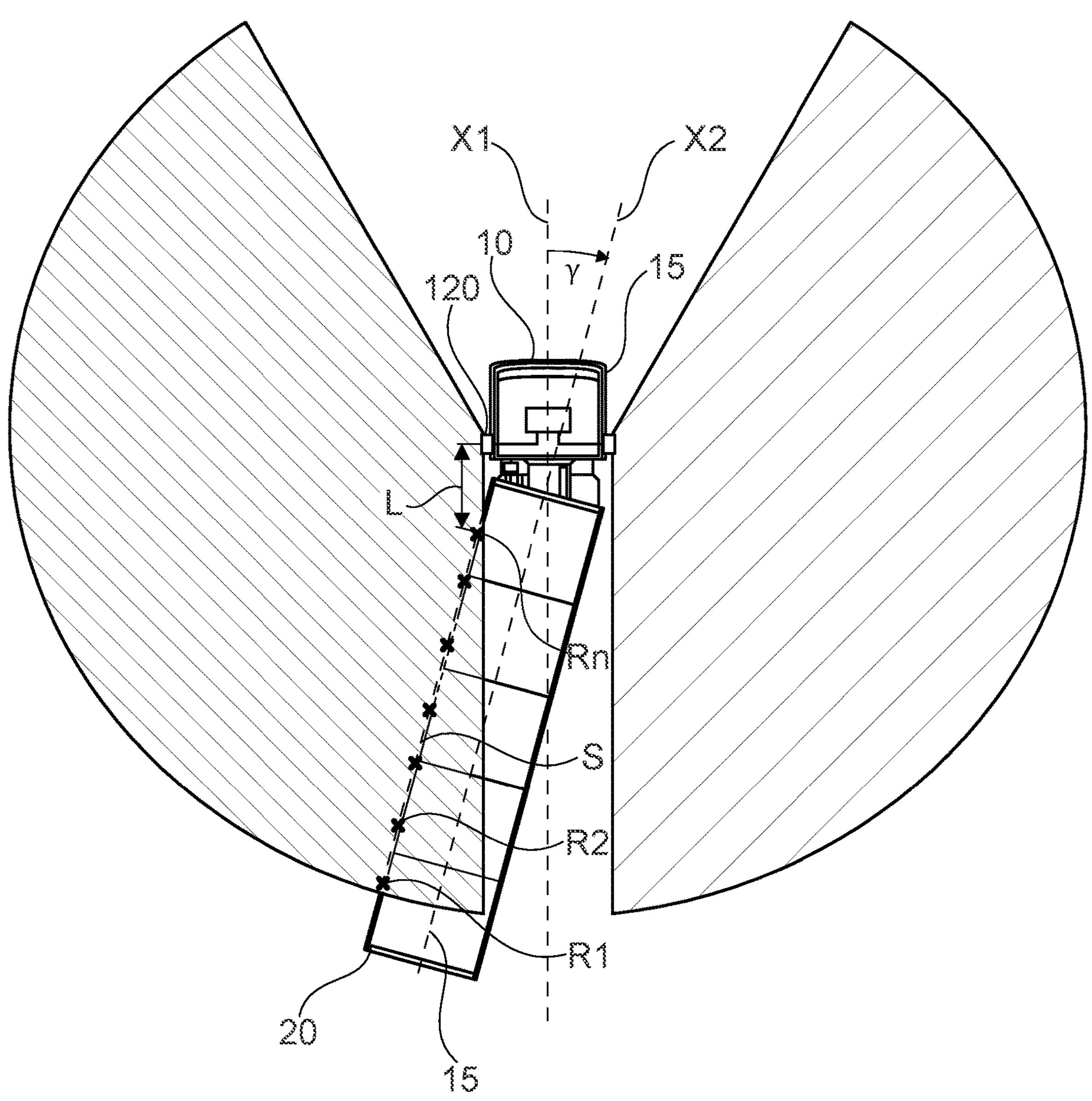
FIGS. 2A, 2B illustrate an exemplary articulation of the vehicle relative to the trailer.
Figure 2B:
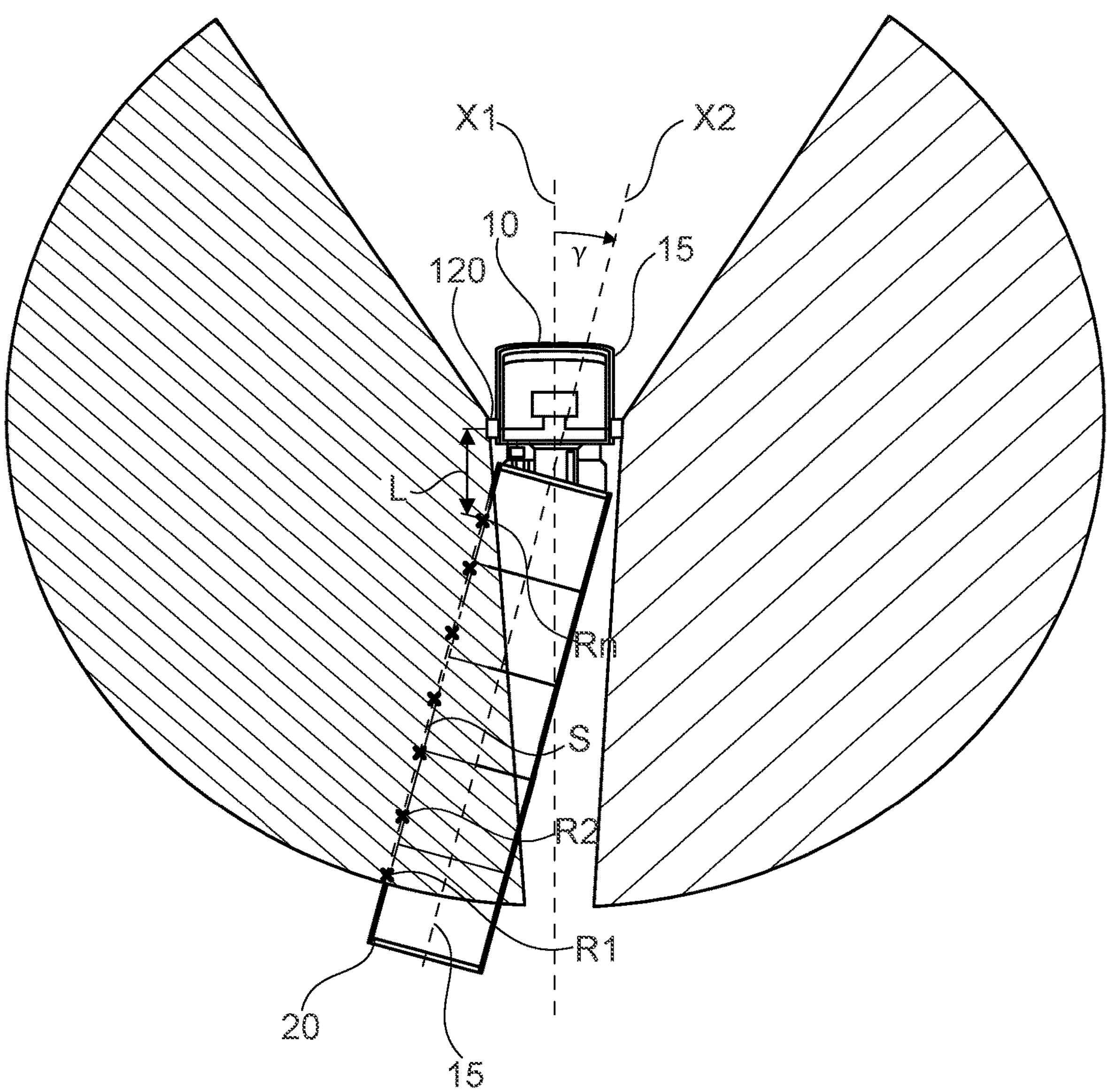

FIG. 2A illustrates an exemplary articulation of the vehicle 10 relative to the trailer 20. In the depicted example the vehicle 10 makes a left turn resulting in a non-zero articulation angle γ defined as the deviation between the longitudinal direction x1 of the vehicle 10 and the longitudinal direction x2 of the trailer. The longitudinal directions are parallel to the left side or right side the vehicle 10 or trailer 20. FIG. 2B shows the articulated situation for the coverage areas 115, 125 as depicted in FIG. 1B.

According to embodiments, the articulation angle γ can be determined as follows.

The second sensor device 120 on the left-hand side detects a plurality of reflection points R1, R2, R3, . . . , Rn from the left side surface of the trailer 20. The closest reflection point for the second sensor device 120 is denoted by Rn and all reflection points R1, R2, . . . are coplanar with the side surface of the trailer 20. The processing unit 130 determines an interpolation S which connects the reflection points R1, R2, . . . and defines a line or a geometric plane. Since this line or plane S is parallel to longitudinal direction x2, the processing unit 130 is able to estimate the longitudinal direction x2 of the trailer 20. Then, according to embodiments, the processing unit 130 determines the articulation angle γ by comparing the estimated longitudinal direction x2 of the trailer 20 with the longitudinal direction x1 of the vehicle 10.

According to another embodiment, the articulation angle γ is determined by making subsequent estimates for the interpolation S. The interpolation S becomes thus a function of time. When the vehicle starts with an articulation angle of 0° (i.e. the vehicle moves straight ahead or with a zero-steering angle), the articulation angle γ will gradually change when the vehicle makes the first turn. Thus, by comparing the changing non-zero articulation angle γ with the initial or with previous values, the articulation angle γ can be determined at each moment in time.

The reflection points R1, R2, . . . may be randomly distributed, i.e. they do not need to be aligned along a line. However, according to embodiments, the processing unit 130 may perform a regression analysis to define the interpolation S and the articulation angle γ can be determined from that component of the interpolation S that extends in parallel to the longitudinal direction x2 of the trailer 20 (see FIGS. 2A, 2B).

According to further embodiments, the first and second sensor devices 110, 120 are two environment sensors such as radar- or lidar or ultrasonic-devices that are mounted on each side of the vehicle 10 and are able to determine also a distance to the reflection points R1, R2, R3, . . . . The first sensor device 110 and the second sensor device 120 may be capable of detecting objects in the coverage areas 115, 125 of the left-hand side and the right-hand side from the vehicle 10 and the trailer 20. The first and second sensor devices 110, 120 can be mounted anywhere along the side of the vehicle 10—at least as long as an adequate field of view 115, 125 is possible that can detect the trailer 20 in any situation with a non-zero articulation angle γ.

According to embodiments, the first sensor device 110 and the second sensor device 120 are mounted on the vehicle such that the trailer 20 is "invisible" for the sensor devices 110, 120, when the articulation angle γ is zero, i.e. the longitudinal axis of the vehicle and the trailer 20 are aligned (the straight situation). In this case, the first and second sensor devices 110, 120 may only detect external objects. According to this embodiment, if the trailer 20 and/or the vehicle 10 do not appear in the field of view 115, 125 of either of the first sensor device 110 and the second sensor device 120, the system will infer the articulation angle γ is zero.

If now the articulation angle γ becomes non-zero, i.e. the vehicle combination makes a turn and the longitudinal axes x1, x2 are no longer aligned. The trailer 20 will then appear in the field of view of only one of the sensor devices 110, 120, depending on the turning direction. For example, during a right turn, only the right-side (first) sensor device 110 will detect the trailer 20 and during a left turn, only the left-side (second) sensor device 120 may detect a trailer 20 (as shown in FIG. 2A). The respective other sensor device will in this case not detect any reflections from the side of the trailer 20, because the trailer side facing away from the turning direction will move into a blind spot.

The sign of the articulation angle γ may be determined by identifying the sensor device 110, 120 that makes a detection of the trailer 20. The value of the articulation angle γ depends on the distance of the closest reflection point Rn to the respective sensor device (the second sensor device 120 in FIG. 2). It is apparent from FIG. 2A that the smaller this minimal distance to the closest reflection point Rn, the large becomes the articulation angle γ of the trailer 20. For example, when only three or one of the depicted reflection point(s) R1, R2, . . . would be detected, the articulation angle γ would be accordingly smaller than in the depicted situation.

The relationship between both the minimal distance and articulation angle γ can be determined in a calibration procedure or by utilizing standard mathematical considerations as well as the known shape and the articulation point of the vehicle 10 and trailer 20. Similarly, the longitudinal length of the interpolation S can also be utilized to find the articulation angle γ. The longer the longitudinal length, the larger the articulation angle γ. In the situation of FIG. 1A, the interpolation line would have a zero-length indicating a non-articulated trailer 20, whereas in the situation of FIGS. 2A, the length of the interpolation line is almost maximum, defining a large articulation angle γ.

This, however, is only one embodiment. As mentioned before, in other embodiments also in the straight situation the first sensor device 110 and the second sensor device 120 are able to detect the trailer 20 by multiple reflection points R1, R2, . . . and the straight situation can be ascertained by detecting reflections on both sides of the trailer 20, whereas for a non-zero articulation angle γ reflections will only occur only on one side of the trailer 20. This situation is shown in FIG. 2B. Also, for this case, the concrete articulation angle γ can be determined based on the concrete form of the interpolation S as described before.

According to further embodiments, a filter will be implemented to avoid any false detections of reflections that are not related to actual articulations of the trailer 20, but may be caused by external irregularities. For example, wind may cause isolated reflection (e.g. if the trailer tarpaulin flatters or cause other lateral fluctuations). Similarly, road bumps or potholes may also cause artificial reflections not related to turning operations. Therefore, the processing unit 130 may be configured to average successively determined interpolations S over a predetermined time period to enable a filtering. For the same reasons, the determined interpolations S that are below a predetermined minimal extension may be ignored.

Figure 3:
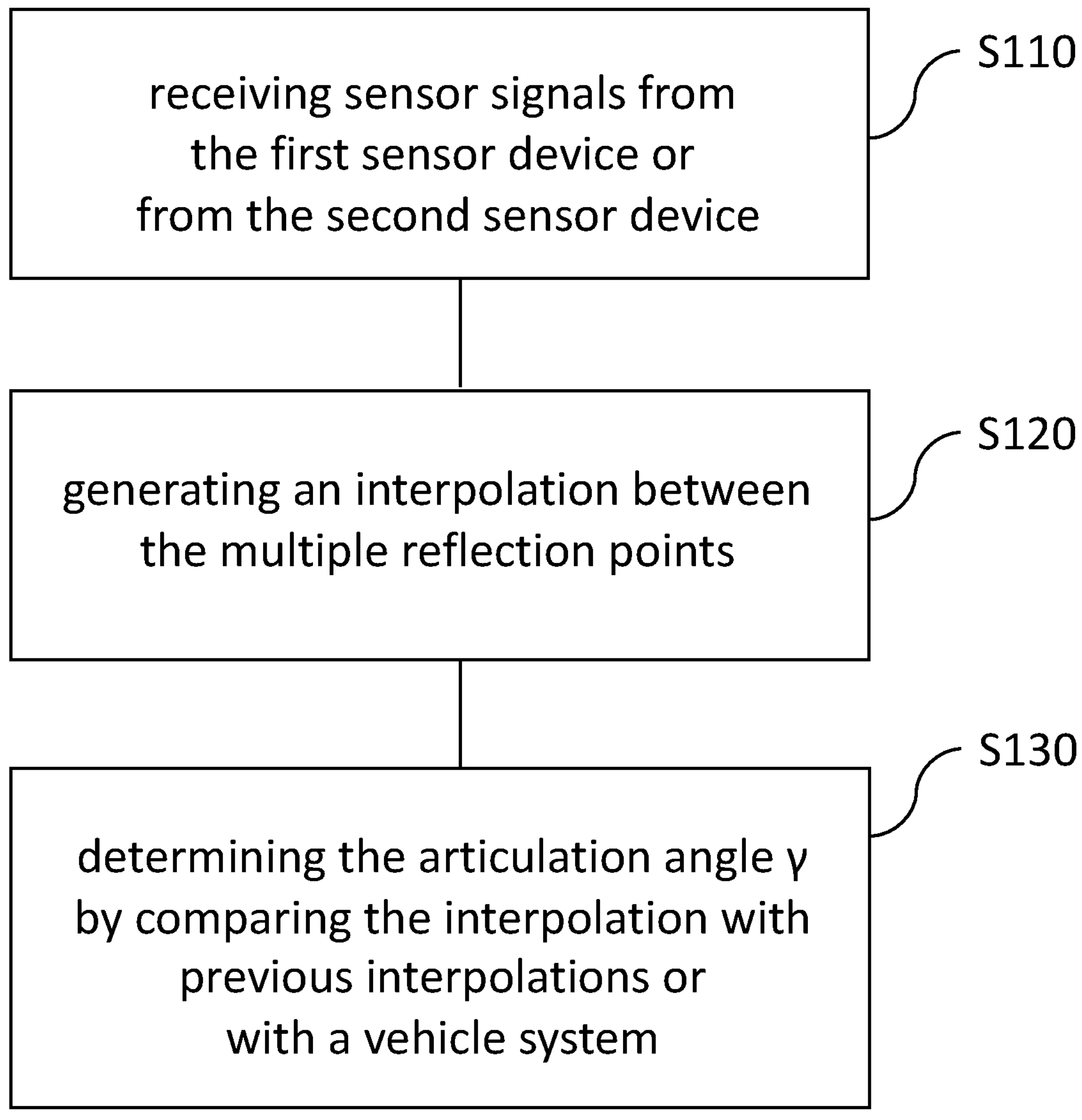
FIG. 3 depicts a flow diagram of a method for determining the articulation angle according to an embodiment of the present invention.

FIG. 3 depicts a flow diagram of a method for determining an articulation angle γ of a vehicle 10 with a trailer 20, wherein a first sensor device 110 is mounted on a first side of the vehicle 10 and a second sensor device 120 is mounted on a second side of the vehicle 10. The method includes the steps:

receiving S110 first sensor signals from the first sensor device 110 and/or second sensor signals from the second sensor device 120 as multiple reflection points R1, R2, . . . , Rn of the first and/or the second side of the trailer 20;

generating S120 an interpolation S between the multiple reflection points R1, R2, . . . , Rn; and determining S130 the articulation angle γ by comparing the interpolation S with previous interpolations or with a vehicle coordinate system 15.

This method may also be a computer-implemented method. A person of skill in the art would readily recognize that steps of various above-described methods may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described methods, when executed on the computer or processor. Therefore, embodiments may also utilize available hardware on the vehicle 10 to enable a determination of the articulation angle, which the processing unit 130 may be given any of the available electronic control units in the vehicle, if it is programmed accordingly.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

10 vehicle (towing vehicle such as a truck)
15 vehicle coordinate system (of truck or trailer)
20 trailer (towed vehicle)
110, 120 sensor devices
115, 125 fields of view of sensors
130 processing unit
γ articulation angle
S interpolation (e.g. a line, a plane, an area)
R1, . . . Rn reflection points

What is claimed is:

1. A sensor system for determining an articulation angle of a vehicle with a trailer, comprising:

a first sensor device mountable on a first side wall of the vehicle, the first sensor device being configured to provide first sensor signals as multiple reflection points of a first side wall of the trailer;

a second sensor device mountable on a second side wall of the vehicle, the second sensor device being configured to provide second sensor signals as multiple reflection points of a second side wall of the trailer; and a processing unit configured to generate an interpolation between the multiple reflection points in the first sensor signals or in the second sensor signals and to determine the articulation angle by comparing the interpolation with previous interpolations or with a vehicle coordinate system, wherein the processing unit is further configured to ignore reflections from a front side wall of the trailer and to consider only reflection points from a left-hand side wall of the trailer and/or a right-hand side wall of the trailer when generating the interpolation, wherein the first sensor device and/or the second sensor device are mounted on the vehicle such that no reflections corresponding to the trailer are detected by the first and second sensor devices when the vehicle is moving together with the trailer in a straight-ahead direction.

2. The sensor system according to claim 1, wherein the first sensor device and the second sensor device each include a radar device, a lidar device, or an ultrasonic device.

3. The sensor system according to claim 1, wherein the processing unit is configured to consider any random reflection points on the trailer when generating the interpolation.

4. The sensor system according to claim 1, wherein the processing unit is configured to generate as the interpolation a line or a plane or a surface approximating the left-hand side wall or the right-hand side wall of the trailer.

5. The sensor system according to claim 1, wherein the processing unit is configured to ascertain a zero-articulation angle, when one or more of the following conditions are met:

when the first sensor device and the second sensor device are not providing any reflection points, when both the first sensor device and the second sensor device are providing reflection points, when the first sensor device and the second sensor device are not providing any reflection points or are providing symmetric reflection points, or when the vehicle makes a straight motion.

6. The sensor system according to claim 1, wherein the processing unit is configured to generate multiple interpolations successively when the vehicle is moving with the trailer to determine the articulation angle as function of time.

7. The sensor system according to claim 6, wherein the processing unit is configured to average successively determined interpolations over a predetermined time period and/or to ignore determined interpolations that are below a predetermined minimal extension to enable a filtering.

8. The sensor system according to claim 1, wherein the processing unit is configured to enable a calibration, wherein during the calibration the processing unit is configured determine the articulation angle and to compare the determined articulation angle with a calibration value, and the calibration value is provided by a secondary articulation sensor or by moving the vehicle along a predetermined path associated with a fixed articulation angle.

9. A vehicle, comprising:

a sensor system according to claim 1, wherein the first sensor device is mounted on the right-hand side wall of the vehicle and the second sensor device is mounted on the left-hand side wall of the vehicle.

10. The vehicle according to claim 9, wherein the vehicle is an articulated vehicle; and the first sensor device is mounted on the right-hand side wall of the articulated vehicle and the second sensor device is mounted on the left-hand side wall of the articulated vehicle.

11. A method for determining an articulation angle of a vehicle with a trailer, wherein a first sensor device is mounted on a first side wall of the vehicle and a second sensor device is mounted on a second side wall of the vehicle, the method comprising:

receiving first sensor signals from the first sensor device or second sensor signals from the second sensor device as multiple reflection points of the first or second side wall of the trailer;

generating an interpolation connecting the multiple reflection points; and determining the articulation angle by comparing the interpolation with previous interpolations or with a vehicle coordinate system, wherein the first sensor device and/or the second sensor device are mounted on the vehicle such that no reflections corresponding to the trailer are detected by the first and second sensor devices when the vehicle is moving together with the trailer in a straight-ahead direction.

12. A computer product comprising a non-transitory computer-readable storage medium having program code stored thereon which, when the program code is executed on one or more processing units, causes the acts of:

receiving first sensor signals from a first sensor device or second sensor signals from a second sensor device as multiple reflection points of a first or second side wall of a trailer of a vehicle;

generating an interpolation connecting the multiple reflection points; and determining an articulation angle by comparing the interpolation with previous interpolations or with a vehicle coordinate system, wherein the first sensor device and/or the second sensor device are mounted on the vehicle such that no reflections corresponding to the trailer are detected by the first and second sensor devices when the vehicle is moving together with the trailer in a straight-ahead direction.

* * * * *